United States Patent
Jindal et al.

(10) Patent No.: US 10,439,960 B1
(45) Date of Patent: Oct. 8, 2019

(54) MEMORY PAGE REQUEST FOR OPTIMIZING MEMORY PAGE LATENCY ASSOCIATED WITH NETWORK NODES

(71) Applicant: Ampere Computing LLC, Santa Clara, CA (US)

(72) Inventors: Ankit Jindal, Pune (IN); Pranavkumar Sawargaonkar, Pune (IN); Keyur Chudgar, San Jose, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 147 days.

(21) Appl. No.: 15/351,477

(22) Filed: Nov. 15, 2016

(51) Int. Cl.
*H04L 12/933* (2013.01)
*G06F 12/06* (2006.01)
*G06F 9/455* (2018.01)

(52) U.S. Cl.
CPC ........ *H04L 49/103* (2013.01); *G06F 9/45558* (2013.01); *G06F 12/0692* (2013.01); *G06F 2009/45583* (2013.01); *G06F 2212/1008* (2013.01)

(58) Field of Classification Search
CPC ............. G06F 12/0802; G06F 12/1009; G06F 12/1027; G06F 12/109; G06F 2009/45583
See application file for complete search history.

(56) References Cited

U.S. PATENT DOCUMENTS

| | | |
|---|---|---|
| 5,226,039 A | 7/1993 | Frank et al. |
| 5,282,201 A | 1/1994 | Frank et al. |
| 5,341,483 A | 8/1994 | Frank et al. |
| 5,541,955 A | 7/1996 | Jacobsmeyer |
| 5,754,764 A | 5/1998 | Davis et al. |
| 6,947,971 B1 | 9/2005 | Amos |
| 8,117,600 B1 * | 2/2012 | Roeck ................. G06F 11/3632 714/38.1 |
| 8,612,711 B1 * | 12/2013 | Griffin .................. G06F 9/5022 711/165 |
| 8,738,860 B1 * | 5/2014 | Griffin ................ G06F 12/0897 711/122 |
| 8,893,267 B1 * | 11/2014 | Sathe ...................... G06F 21/31 711/153 |
| 9,176,889 B1 * | 11/2015 | Earhart, III ........... G06F 9/5016 |
| 9,251,090 B1 * | 2/2016 | Borthakur ........... G06F 12/1009 |
| 9,286,101 B2 * | 3/2016 | van Riel ................. G06F 12/10 |
| 9,385,843 B2 | 7/2016 | Khandekar et al. |
| 9,645,628 B1 * | 5/2017 | Loafman ............... G06F 9/5027 |
| 9,652,560 B1 * | 5/2017 | Wang ..................... G06F 12/08 |
| 9,665,517 B1 * | 5/2017 | Hart .................... G06F 13/4022 |
| 9,767,036 B2 * | 9/2017 | Duluk, Jr. ............. G06F 11/073 |
| 9,792,220 B2 * | 10/2017 | Buschardt ........... G06F 12/1009 |

(Continued)

*Primary Examiner* — Shean Tokuta
(74) *Attorney, Agent, or Firm* — Alston & Bird LLP

(57) ABSTRACT

Various aspects optimize memory page latency and minimize inter processor interrupts associated with network nodes in a virtual computer system. For example, a system can include a first network node and a second network node. The first network node generates a memory page request in response to an invalid memory access associated with a virtual central processing unit of the first network node. The memory page request includes an identifier for the virtual central processing unit. The second network node receives the memory page request and provides memory data associated with memory page request to the first network node.

19 Claims, 11 Drawing Sheets

(56) References Cited

U.S. PATENT DOCUMENTS

| | | | | |
|---|---|---|---|---|
| 9,798,487 B2* | 10/2017 | Duluk, Jr. | | G06F 12/08 |
| 9,830,262 B2* | 11/2017 | Duluk, Jr. | | G06F 12/08 |
| 9,977,690 B2* | 5/2018 | Tsirkin | | G06F 9/45558 |
| 2005/0273571 A1* | 12/2005 | Lyon | | G06F 9/45537 |
| | | | | 711/203 |
| 2009/0089537 A1* | 4/2009 | Vick | | G06F 12/0284 |
| | | | | 711/203 |
| 2009/0307438 A1* | 12/2009 | Logan | | G06F 11/0712 |
| | | | | 711/153 |
| 2010/0321397 A1* | 12/2010 | Ginzburg | | G06F 12/1036 |
| | | | | 345/531 |
| 2011/0107007 A1* | 5/2011 | van Riel | | G06F 9/45558 |
| | | | | 711/6 |
| 2012/0066474 A1* | 3/2012 | Funk | | G06F 12/1027 |
| | | | | 711/207 |
| 2014/0115228 A1* | 4/2014 | Zhou | | G06F 9/45533 |
| | | | | 711/102 |
| 2014/0233588 A1* | 8/2014 | Chudgar | | H04L 47/41 |
| | | | | 370/474 |
| 2014/0281264 A1* | 9/2014 | Duluk, Jr. | | G06F 12/08 |
| | | | | 711/135 |
| 2014/0281297 A1* | 9/2014 | Duluk, Jr. | | G06F 12/1009 |
| | | | | 711/159 |
| 2014/0281299 A1* | 9/2014 | Duluk, Jr. | | G06F 12/122 |
| | | | | 711/160 |
| 2014/0281324 A1* | 9/2014 | Duluk, Jr. | | G06F 12/08 |
| | | | | 711/165 |
| 2014/0281364 A1* | 9/2014 | Buschardt | | G06F 12/1009 |
| | | | | 711/207 |
| 2015/0135175 A1* | 5/2015 | Bacher | | G06F 9/45558 |
| | | | | 718/1 |
| 2015/0234669 A1* | 8/2015 | Ben-Yehuda | | G06F 3/0604 |
| | | | | 718/1 |
| 2015/0269111 A1* | 9/2015 | Bak | | G06F 12/0862 |
| | | | | 711/151 |
| 2016/0019168 A1* | 1/2016 | Rychlik | | G06F 12/1483 |
| | | | | 711/152 |
| 2016/0034294 A1* | 2/2016 | Christenson | | G06F 9/45558 |
| | | | | 718/1 |
| 2016/0139962 A1* | 5/2016 | Tsirkin | | G06F 9/5088 |
| | | | | 718/1 |
| 2016/0224362 A1* | 8/2016 | Tsirkin | | G06F 9/45558 |
| 2016/0224484 A1* | 8/2016 | Bonzini | | G06F 13/32 |
| 2017/0004647 A1* | 1/2017 | Grossman | | G06T 1/60 |
| 2017/0123690 A1* | 5/2017 | Albot | | G06F 9/38 |
| 2017/0123999 A1* | 5/2017 | Aslot | | G06F 12/1009 |
| 2017/0132083 A1* | 5/2017 | Aslot | | G06F 11/1402 |
| 2017/0185526 A9* | 6/2017 | Duluk, Jr. | | G06F 11/073 |
| 2017/0199689 A1* | 7/2017 | Mashey | | G06F 12/1009 |
| 2017/0235491 A1* | 8/2017 | Duluk | | G06F 12/1009 |
| | | | | 711/165 |
| 2017/0249254 A9* | 8/2017 | Duluk, Jr. | | G06F 11/073 |
| 2017/0286198 A9* | 10/2017 | Duluk, Jr. | | G06F 11/073 |
| 2017/0329717 A9* | 11/2017 | Duluk, Jr. | | G06F 11/073 |
| 2017/0337074 A1* | 11/2017 | Tsirkin | | G06F 9/45558 |
| 2017/0371802 A9* | 12/2017 | Buschardt | | G06F 12/1009 |
| 2018/0011793 A1* | 1/2018 | Leslie-Hurd | | G06F 12/0844 |
| 2018/0060100 A1* | 3/2018 | Tsirkin | | G06F 9/45558 |
| 2018/0095780 A1* | 4/2018 | Christenson | | G06F 9/45558 |
| 2018/0373561 A1* | 12/2018 | Nassi | | G06F 9/4881 |

\* cited by examiner

MEMORY PAGE REQUEST FOR OPTIMIZING MEMORY PAGE LATENCY ASSOCIATED WITH NETWORK NODES

TECHNICAL FIELD

The subject disclosure relates generally to virtual computer systems, and more particularly to memory page requests and/or processor interrupts in a multi-node network system.

BACKGROUND

A virtual computer is a software computer environment that emulates a hardware computer environment. For example, a hypervisor associated with a virtual computer can emulate a central processing unit and/or other hardware components. In a virtual computer system, an operating system that manages a virtual computer environment can be maintained by a first network node associated with a first processor core. The first network node can receive data packets from a network and provide the data packets to the operating system that manages the virtual computer environment. A second network node associated with a second processor core can also be employed to provide memory page data for the data packet when the data packet is not mapped to the first network node. The first network node and the second network node can also collaboratively handle an invalid memory access associated with a virtual central processing unit of the virtual computer environment. For example, multiple inter processor interrupts can be performed to facilitate handling of an invalid memory access associated with a virtual central processing unit of the virtual computer environment. However, it is desirable to reduce latency for handling an invalid memory access associated with a virtual central processing unit of a virtual computer environment. Furthermore, it is desirable to minimize inter processor interrupts in a virtual computer environment.

The above-described description is merely intended to provide a contextual overview of current virtual computer systems and/or current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a first network node and a second network node. The first network node is configured for generating a memory page request in response to an invalid memory access associated with a virtual central processing unit of the first network node. The memory page request comprises an identifier for the virtual central processing unit. The second network node is configured for receiving the memory page request and providing memory data associated with memory page request to the first network node.

In another example embodiment, a method provides for generating a memory page request that comprises an identifier for a virtual central processing unit in response to an invalid memory access associated with the virtual central processing unit, transmitting the memory page request to a network device, receiving a memory page acknowledgment that comprises the identifier for the virtual central processing unit, and interrupting a host central processing unit associated with the virtual central processing unit that corresponds to the identifier in the memory page acknowledgment.

In yet another example embodiment, a network device comprises a virtual central processing unit, a memory coherency manager and a host central processing unit. The virtual central processing unit is configured for generating an abort signal in response to an invalid memory access associated with a guest physical address. The memory coherency manager is configured for generating a page request message in response to the invalid memory access. The page request message comprises an identifier for the virtual central processing unit. The page request message is transmitted to another network device coupled to the network device via a physical communication channel. The host central processing unit is configured for facilitating mapping of the guest physical address to a physical address associated with the network device.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
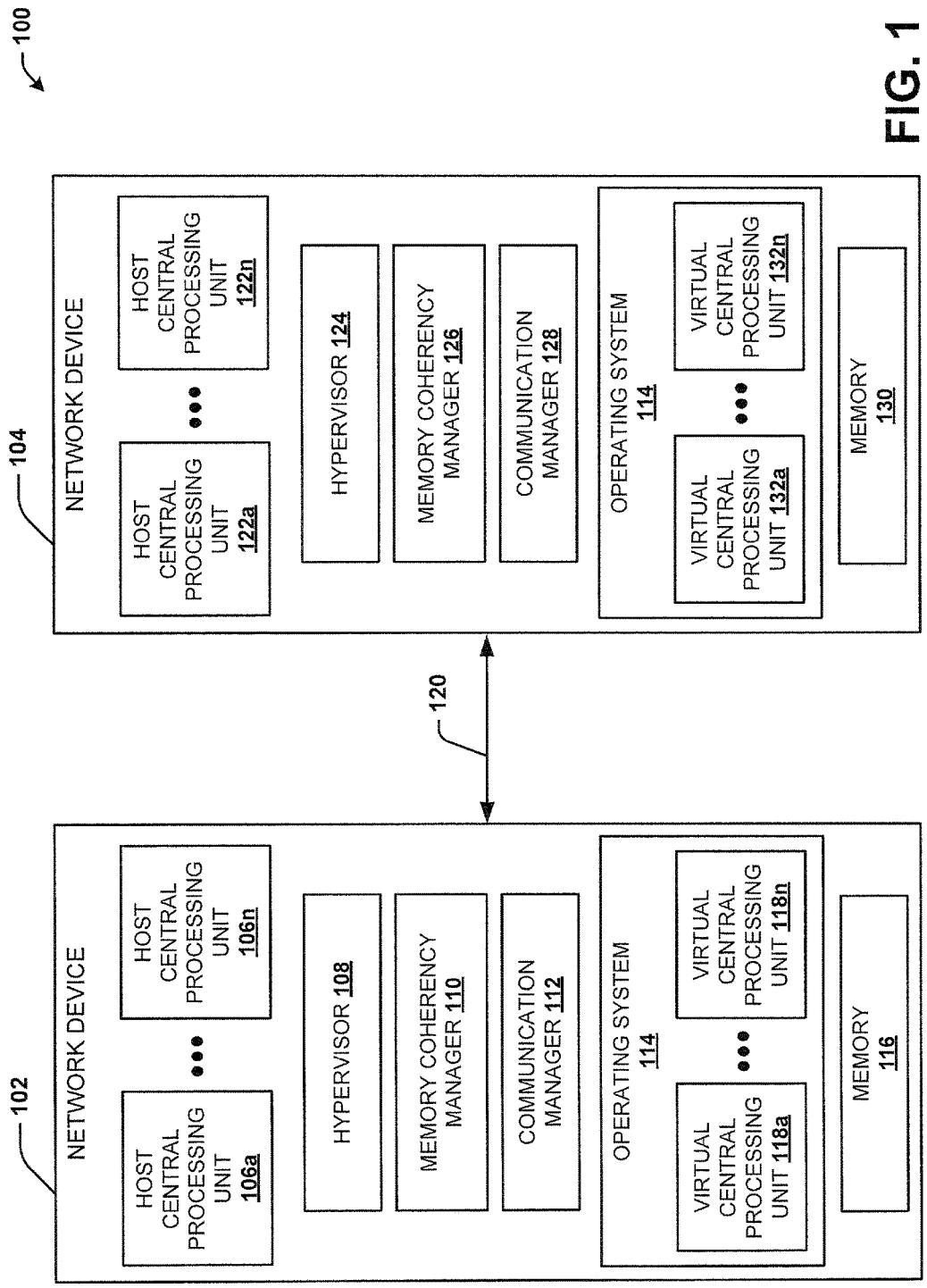
FIG. 1 is a block diagram illustrating an example, non-limiting embodiment of a multi-node system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

In a network system (e.g., a virtual computer network system), a virtual central processing unit of a first network device (e.g., a network node) can perform an invalid memory access. For example, the virtual central processing unit can attempt to access a guest physical address that is not currently owned by the virtual central processing unit. As such, the first network device and a second network device can collaboratively handle the invalid memory access. For example, the first network device can determine that the second network device owns the guest physical address associated with the invalid memory access. As such, the second network device can provide memory data associated with the invalid memory access to the first network device. The first network device can also perform multiple inter processor interrupts in response to receiving the memory data from the second network device and/or while restoring functionality of the virtual central processing unit associated with the invalid memory access. However, handling of an invalid memory access by a first network device and a second network device in a network system generally results in unwanted latency due to multiple inter processor interrupts, inefficient processing as a result of the invalid memory access, and/or other inefficiencies associated with the network system.

To address these and/or other issues, various aspects of the present disclosure provide an improved multi-node network system (e.g., a multi-node virtual computer network system). For example, memory page latency in a multi-node network system can be optimized, inter processor interrupts associated with a multi-node network system can be minimized, and/or performance across a multi-node network system can be improved. In an aspect, a novel identifier parameter can be added to a memory page request transmitted between a first network node and a second network node of the multi-node system. For example, the memory page request transmitted between the first network node and the second network node of the multi-node system can include an identifier for a virtual central processing unit associated with an invalid memory access. Additionally, the identifier parameter can be added to a memory page acknowledgment (e.g., a memory page reply) transmitted between the first network node and the second network node of the multi-node system. For example, the memory page acknowledgment transmitted between the first network node and the second network node of the multi-node system can also include the identifier for the virtual central processing unit associated with the invalid memory access. In another aspect, processor interrupt affinity can be set to a single processor core of a network device rather than broadcasting a processor interrupt to all processor cores of the network device. For instance, a processor interrupt can be exclusively provided to a single processing unit associated with the memory page request and/or the memory page acknowledgment without broadcasting the processor interrupt to other processing units that are note associated with the memory page request and/or the memory page acknowledgment. As such, latency associated with an invalid memory access in a multi-node network system can be reduced, inter processor interrupts in a multi-node network system can be minimized, and/or performance of a multi-node network system can be improved. In a non-limiting example, latency can be reduced by more than four microseconds per guest physical address page fault.

Turning now to FIG. 1, a block diagram illustrating an example, non-limiting embodiment of a system 100 in accordance with various aspects described herein is shown. The system 100 can be a multi-node system (e.g., a multi-node coherent system) and/or a network system (e.g., a virtual computer network system) that includes at least a network device 102 and a network device 104. The network device 102 can be a first system on a chip (SoC) and the network device 104 can be a second SoC. Furthermore, the system 100 can be associated with and/or included in a receiver device. In one example, the system 100 can be associated with a virtual network system. The system 100 can be employed by various systems, such as, but not limited to a data center system, a data mining system, a real-time analytics system, a machine learning system, a predictive analysis system, a media content system, a content management system, a computer network system, a communication system, a router system, a server system, a high availability server system (e.g., Telecom server systems), a Web server system, a disk array system, a powered insertion board system, a cloud-based system, and/or another type of system. It is to be appreciated that the system 100 can include more than two network devices. For example, in certain implementations, the system 100 can include four network devices, the system 100 can include eight network devices, etc.

The network device 102 can include host central processing units 106a-n, a hypervisor 108, a memory coherency manager 110, a communication manager 112, an operating system 114 and a memory 116. The operating system 114 can be associated with virtual central processing units 118a-n. The hypervisor 108 can be responsible for virtualization functionality associated with the network device 102. For example, the hypervisor 108 can manage virtualization functionality associated with the virtual central processing units 118a-n. The hypervisor 108 can be a virtual machine manager for the virtual central processing units 118a-n. In an embodiment, the hypervisor 108 can be computer software or computer firmware that creates and/or runs the virtual central processing units 118a-n associated with the operating system 114. The memory coherency manager 110 can manage memory coherency associated with the network device 102 and/or the network device 104. The communication manager 112 can manage communications between the network device 102 and the network device 104. In an aspect, the communication manager 112 can be associated with an interconnect technology that enables at least the network device 102 and the network device 104 to be connected.

The virtual central processing units 118a-n can be associated with the host central processing units 106a-n. In an implementation, the host central processing units 106a-n can be physical central processing unit cores assigned to the virtual central processing units 118a-n. A single virtual central processing unit 118a-n can be assigned to a single host central processing unit 106*a-n* to achieve improved cache benefits associated with the memory 116 and/or low scheduling overheads for processing data packet(s) received by the network device 102. For example, a first virtual central processing units 118*a* can be assigned to a first host central processing unit 106*a*, a second virtual central processing units 118*b* can be assigned to a second host central processing unit 106*b*, etc. The memory 116 can be, for example, random access memory associated with the host central processing units 106*a-n*. However, it is to be appreciated that the memory 116 can be a different type of memory.

The operating system 114 can be distributed between the network device 102 and the network device 104 (e.g., between processor core(s) of the network device 102 and the network device 104). For instance, a first portion of the operating system 114 can be maintained by the network device 102 (e.g., processor core(s) of the network device 102) and a second portion of the operating system 114 can be maintained by the network device 104 (e.g., processor core(s) of the network device 104). In one example, the operating system 114 can be distributed on processor core(s) of network device 102 and processor core(s) of the network device 104. Therefore, the network device 102 and the network device 104 can be associated with a corresponding operating system (e.g., the operating system 114). The operating system 114 can be associated with a virtual computer environment. In one example, the network device 102 can be a first node (e.g., a first network node) of a network system and the network device 104 can be a second node (e.g., a second network node) of a network system.

The network device 102 can be coupled to the network device 104 via a communication channel 120. The communication channel 120 can be a physical communication channel such as, but not limited to, a Peripheral Component Interconnect Express (PCIe) communication channel, an Ethernet communication channel, a remote direct memory access (RDMA) communication channel, another type of communication channel, etc. Furthermore, the communication channel 120 can be associated with a physical transport layer (e.g., a physical transport layer protocol). The network device 104 can include the operating system 114, host central processing units 122*a-n*, a hypervisor 124, a memory coherency manager 126, a communication manager 128, and a memory 130. The operating system 114 can be associated with virtual central processing units 132*a-n*. One or more of the virtual central processing units 132*a-n* can correspond to the virtual central processing units 118*a-n*. Additionally or alternatively, one or more of the virtual central processing units 132*a-n* can be different than the virtual central processing units 118*a-n*. In an aspect, data can be transferred between the network device 102 and the network device 104 based on a ring topology. For example, the network device 102 can generate and/or maintain a software ring for each host central processing unit 106*a-n* associated with the network device 102 to facilitate receiving messages from the network device 104. Software rings can be accessible from the network device 104. Furthermore, when a message is sent to a software ring, an interrupt can be generated. The interrupt can be transmitted to a particular host central processing unit 106*a-n* that is associated with the software ring that receives the interrupt. For example, a first ring interrupt (e.g., ring_0) can be transmitted to the first host central processing unit 106*a*, a second ring interrupt (e.g., ring_1) can be transmitted to the second host central processing unit 106*b*, etc. As such, each ring interrupt can have an affinity to a single CPU rather than broadcasting a ring interrupt to all of the host central processing unit 106*a-n*.

The first network device 102 can generate a memory page request for the network device 104 in response to an invalid memory access associated with the virtual central processing units 118*a-n*. For example, the virtual central processing unit 118*a* can be associated with an invalid memory access when the virtual central processing unit 118*a* attempt to access a memory space of the memory 116 that is not currently owned by the virtual central processing unit 118*a*. In one example, the virtual central processing unit 118*a* can be associated with an invalid memory access when the virtual central processing unit 118*a* attempt to access a guest physical address page that is not currently owned by the virtual central processing unit 118*a*.

In an aspect, in response to a determination that a virtual central processing unit 118*a-n* is associated with an invalid memory access, an abort fault signal (e.g., a data abort fault or an instruction abort fault) can be provided to the hypervisor 108. For example, an abort fault signal (e.g., a data abort fault or an instruction abort fault) for a guest physical address page can be provided to the hypervisor 108 in response to a determination that a virtual central processing unit 118*a-n* is associated with an invalid memory access, an abort fault signal. The guest physical address page can be physical address page for a virtual central processing unit 118*a-n*. The hypervisor 108 can forward the abort fault signal to the memory coherency manager 110 and/or the communication manager 112 to handle the fault associated with the abort fault signal. The memory coherency manager 110 can then generate a memory page request associated with the invalid memory access. The memory page request can include, for example, a identifier for a particular virtual central processing unit 118*a-n* associated with the memory page request. The communication manager 112 can transmit the memory page request to the network device 104 in response to a determination that the network device 104 owns a memory space associated with the invalid memory access.

In a non-limiting example where the first virtual central processing unit 118*a* is associated with a fault due to the first virtual central processing unit 118*a* attempting to access a guest physical address which is not currently owned by the first virtual central processing unit 118*a*, the first virtual central processing unit 118*a* can provide an abort fault signal to the hypervisor 108. The hypervisor 108 can check for the guest physical address. In response to a determination by the hypervisor 108 that the hypervisor 108 cannot locate guest physical address, the abort fault signal can be forwarded to the memory coherency manager 110 and/or the communication manager 112 for further handling. The memory coherency manager 110 can determine a state of the guest physical address. In response to a determination by the memory coherency manager 110 that the guest physical address is owned by another network device (e.g., the network device 104), the memory coherency manager 110 can allocate a free physical address associated with the other network device (e.g., allocate a free physical address associated with the memory 116). Additionally, the memory coherency manager 110 can generate a page request message (e.g., a memory page request). The page request message can include the guest physical address, the physical address and an identifier for the first virtual central processing unit 118*a*. The identifier for the first virtual central processing unit 118*a* can be, for example, a bit value that correspond to the first virtual central processing unit 118*a*. The memory coherency manager 110 can also stop processing associated with the first virtual central processing unit 118a by changing a state of the first virtual central processing unit 118a to a pause state. The page request message can be transmitted to the communication manager 112. The communication manager 112 can provide the page request message to a network device that owns a memory associated with the guest physical address. For instance, in response to a determination that the memory 130 of the network device 104 is associated with the guest physical address, the communication manager 128 can transmit the page request message to the network device 104 (e.g., the communication manager 128 of the network device 104). The communication manager 128 can also transmit an interrupt to the network device 104.

The communication manager 128 of the network device 104 can forward the page request message to memory coherency manager 126 of the network device 104. The memory coherency manager 126 can copy data associated with the page request message to the physical address of the memory 130 (e.g., the physical address that is included in the page request message for the guest physical address). The memory coherency manager 126 can also generate a page acknowledgment message. The page acknowledgment message can include the guest physical address, the physical address and an identifier for the first virtual central processing unit 118a. The identifier for the first virtual central processing unit 118a can correspond to the identifier included in the page request message. The page acknowledgment message can be transmitted to the communication manager 128. The communication manager 128 can then transmit the page acknowledgment message to the network device 102. The communication manager 128 can also generate an interrupt message for the network device 102. For example, the interrupt can be transmitted to a programmable interrupt controller of the network device 102. In response to receiving the interrupt, the network device 102 can interrupt the first host central processing unit 106a associated with the first virtual central processing unit 118a identified by the identifier included in the page acknowledgment message. The network device 102 can interrupt the first host central processing unit 106a without interrupting the other host central processing units 106b-n.

The first host central processing unit 106a can send the interrupt to the communication manager 112. In addition to receiving the interrupt from the first host central processing unit 106a, the communication manager 112 can receive the page acknowledgment message from the network device 104. The communication manager 112 can forward the interrupt and the page acknowledgment message to the memory coherency manager 110. In response to a determination by the memory coherency manager 110 that the page request for the first host central processing unit 106a is served, the memory coherency manager 110 can map the guest physical address to the physical address. Additionally, the first host central processing unit 106a can inform the hypervisor 108 to wake up the virtual central processing unit 118a. The hypervisor 108 can then wake up (e.g., immediately wake up) the virtual central processing unit 118a since the virtual central processing unit 118a is local to the hypervisor 108. Therefore, the virtual central processing unit 118a can proceed with further processing and/or can execute processing without faulting the guest physical address page.

In certain embodiments, the network device 102 can receive one or more data packets. The one or more data packets can be associated with a network (e.g., an external network, an outside network, etc.). For instance, a data packet can be transmitted to the network device 102 via a network (e.g., an external network, an outside network, etc.). In one example, a data packet can be transmitted to the network device 102 via a coherent optical network. Furthermore, in certain implementations, an invalid memory access performed by a virtual central processing unit 118a-n can be associated with a data packet received by the network device 102. In an aspect, the hypervisor 108 can manage and/or analyze a data packet received by the network device 102. Furthermore, the hypervisor 108 can forward a data packet to a virtual central processing unit 118a-n for further processing. In another aspect, network device 102 can maintain information regarding the system 100 to facilitate transmission of a data packet such as, but not limited to, number of network devices in the system 100 (e.g., number of network nodes in the system 100), number of active network devices in the system 100, network addresses for each network device in the system 100, other information regarding the system 100, etc.

Figure 2:
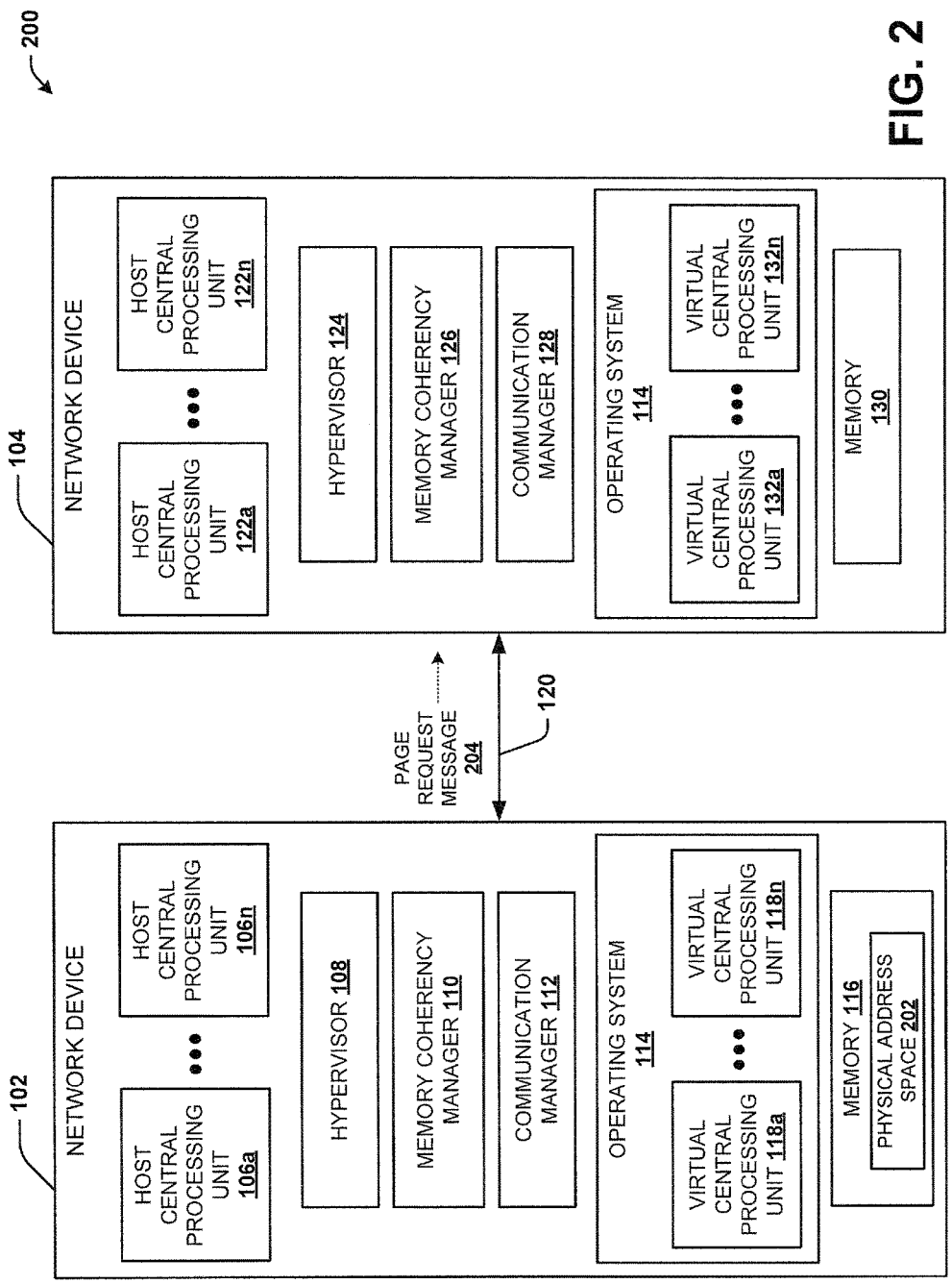
FIG. 2 is a block diagram illustrating another example, non-limiting embodiment of a multi-node system in accordance with various aspects described herein.

FIG. 2 is a block diagram illustrating an example, non-limiting embodiment of a system 200 in accordance with various aspects described herein is shown. The system 200 can be an embodiment of a network system that includes at least the network device 102 and the network device 104. The network device 102 can include the host central processing units 106a-n, the hypervisor 108, the memory coherency manager 110, the communication manager 112, the operating system 114 and the memory 116. A portion of the operating system 114 realized by the network device 102 can be associated with the virtual central processing units 118a-n. The network device 104 can include the operating system 114, the host central processing units 122a-n, the hypervisor 124, the memory coherency manager 126, the communication manager 128, and the memory 130. A portion of the operating system 114 realized by the network device 104 can be associated with the virtual central processing units 132a-n.

In an embodiment, a virtual central processing unit 118a-n associated with the network device 102 can attempt to access data stored in the memory 116 or store data in the memory 116. However, in certain scenarios, a virtual central processing unit 118a-n can attempt to access or store invalid data. As such, a virtual central processing unit 118a-n can be associated with an invalid memory access associated with the attempt to access or store invalid data. An abort signal can be generated by the network device 102 (e.g., a virtual central processing unit 118a-n can generate the abort signal) in response to a determination that a virtual central processing unit 118a-n has attempted to access or store invalid data associated with the memory 116. The hypervisor 108 can receive the abort signal. Furthermore, the hypervisor 108 can forward the abort signal to the memory coherency manager 110 and/or the communication manager 112. In response to the abort signal, the memory coherency manager 110 can allocate a physical address space 202 in the memory 116. Additionally, in response to the abort signal, the memory coherency manager 110 and/or the communication manager 112 can generate a page request message 204. The page request message 204 can be a request for the guest physical address. The page request message 204 can also be a page request signal that includes a guest physical address associated with an invalid memory access performed by a particular virtual central processing unit 118a-n, a physical address (e.g., a host physical address) for a physical address space allocated in the memory 116 in response to the invalid memory access, permission data to allow access to the memory 116 and/or the memory 130, and an identifier for the particular virtual central processing unit 118a-n associated with the invalid memory access. In an aspect, the particular virtual central processing unit 118a-n associated with the identifier in the page request message 204 can be a virtual central processing unit associated with an abort signal. For example, the particular virtual central processing unit 118a-n associated with the identifier in the page request message 204 can be a virtual central processing unit that has attempted to access or store invalid data associated with the memory 116. The network device 102 can transmit the page request message 204 to the network device 104 via the communication channel 120. Furthermore, the network device 104 can process the page request message 204 to facilitate determination of memory data for the network device 102.

Figure 3:
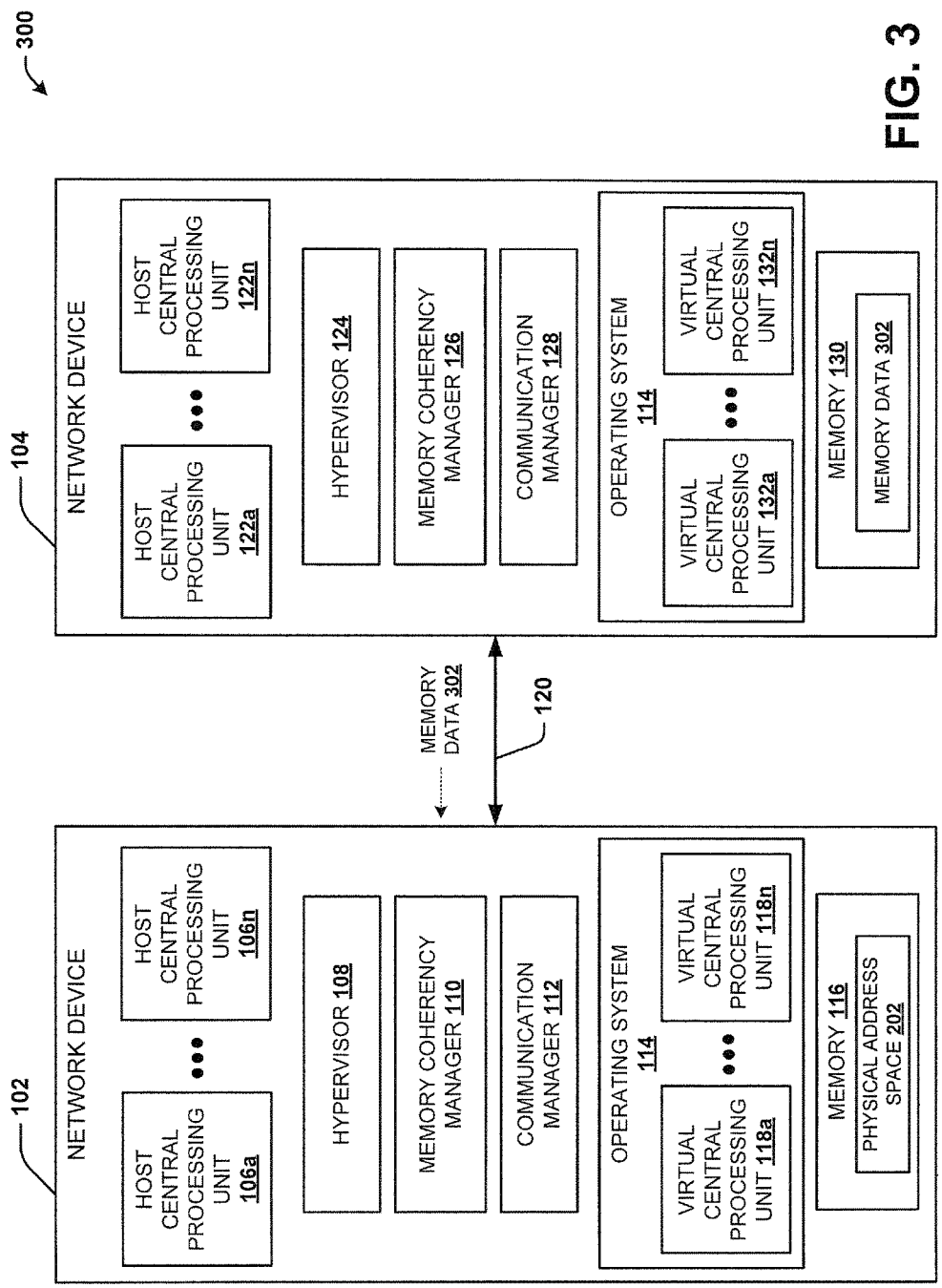
FIG. 3 is a block diagram illustrating yet another example, non-limiting embodiment of a multi-node system in accordance with various aspects described herein.

Referring now to FIG. 3, a block diagram illustrating an example, non-limiting embodiment of a system 300 in accordance with various aspects described herein is shown. The system 300 can be an embodiment of a network system that includes at least the network device 102 and the network device 104. The network device 102 can include the host central processing units 106a-n, the hypervisor 108, the memory coherency manager 110, the communication manager 112, the operating system 114 and the memory 116. A portion of the operating system 114 realized by the network device 102 can be associated with the virtual central processing units 118a-n. The network device 104 can include the operating system 114, the host central processing units 122a-n, the hypervisor 124, the memory coherency manager 126, the communication manager 128, and the memory 130. A portion of the operating system 114 realized by the network device 104 can be associated with the virtual central processing units 132a-n. In an embodiment, the network device 104 can determine and/or locate memory data 302 associated with the page request message 204. For example, the network device 104 can locate the memory data 302 in the memory 130 of the network device 104. The memory 130 can be, for example, random access memory associated with the network device 104. However, it is to be appreciated that the memory 130 can be a different type of memory. A location of the memory data 302 can, for example, correspond to the guest physical address included in the page request message 204. In an aspect, the network device 104 can transmit the memory data 302 to the network device 102 via the communication channel 120. Furthermore, the network device 102 can provide the memory data 302 to the operating system 114 associated with the first network device via a particular host central processing unit 106a-n associated with the particular virtual central processing unit 118a-n identified in the page request message 204.

Figure 4:
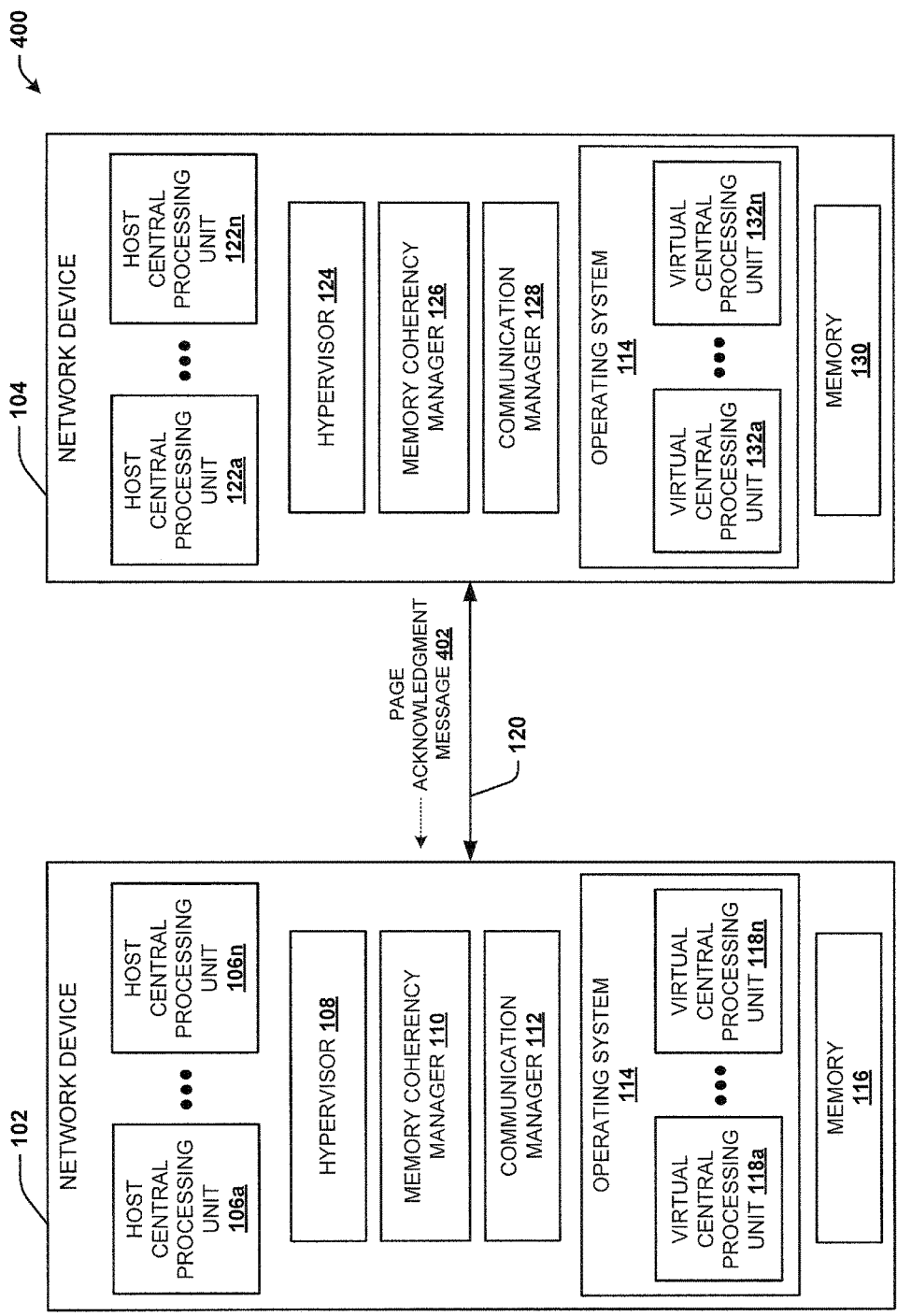
FIG. 4 is a block diagram illustrating yet another example, non-limiting embodiment of a multi-node system in accordance with various aspects described herein.

Referring now to FIG. 4, a block diagram illustrating an example, non-limiting embodiment of a system 400 in accordance with various aspects described herein is shown. The system 400 can be an embodiment of a network system that includes at least the network device 102 and the network device 104. The network device 102 can include the host central processing units 106a-n, the hypervisor 108, the memory coherency manager 110, the communication manager 112, the operating system 114 and the memory 116. A portion of the operating system 114 realized by the network device 102 can be associated with the virtual central processing units 118a-n. The network device 104 can include the operating system 114, the host central processing units 122a-n, the hypervisor 124, the memory coherency manager 126, the communication manager 128, and the memory 130. A portion of the operating system 114 realized by the network device 104 can be associated with the virtual central processing units 132a-n. In an embodiment, the network device 104 can send a page acknowledgment message 402 to the network device 102 via the communication channel 120. The page acknowledgment message 402 can be a memory page acknowledgment (e.g., a page request signal) that includes the guest physical address included in the page request message 204, the physical address included in the page request message 204, and the identifier included in the page request message 204.

In an aspect, the network device 102 can generate an interrupt for a particular host central processing unit 106a-n that corresponds to the particular virtual central processing unit 118a-n associated with the identifier included in the page acknowledgment message 402. The network device 102 can interrupt the particular host central processing unit 106a-n without interrupting other particular host central processing unit 106a-n associated with the network device 102. For example, the host central processing unit 106a can be interrupted without interrupting the other host central processing units 106b-n. As such, the network device 102 can generate an interrupt signal for a host central processing unit of the network device 102 without broadcasting the interrupt signal to other host central processing units associated with the network device 102. Furthermore, the memory coherency manager 110 of the network device 102 can map the guest physical address (e.g., the guest physical address included in the page acknowledgment message 402) to the physical address (e.g., the physical address included in the page acknowledgment message 402). For example, the memory coherency manager 110 can map a guest physical address associated with particular virtual central processing unit 118a-n to a physical address associated with the physical address space 202 in response to the page acknowledgment message 402. The memory coherency manager 110 of the network device 102 can also inform the hypervisor 108 to wake up the virtual central processing unit associated with the identifier included in the page acknowledgment message 402. As such, normal processing of the virtual central processing unit associated with the identifier included in the page acknowledgment message 402 can be resumed without creating an abort signal when accessing the guest physical address included in the page acknowledgment message 402.

Figure 5:
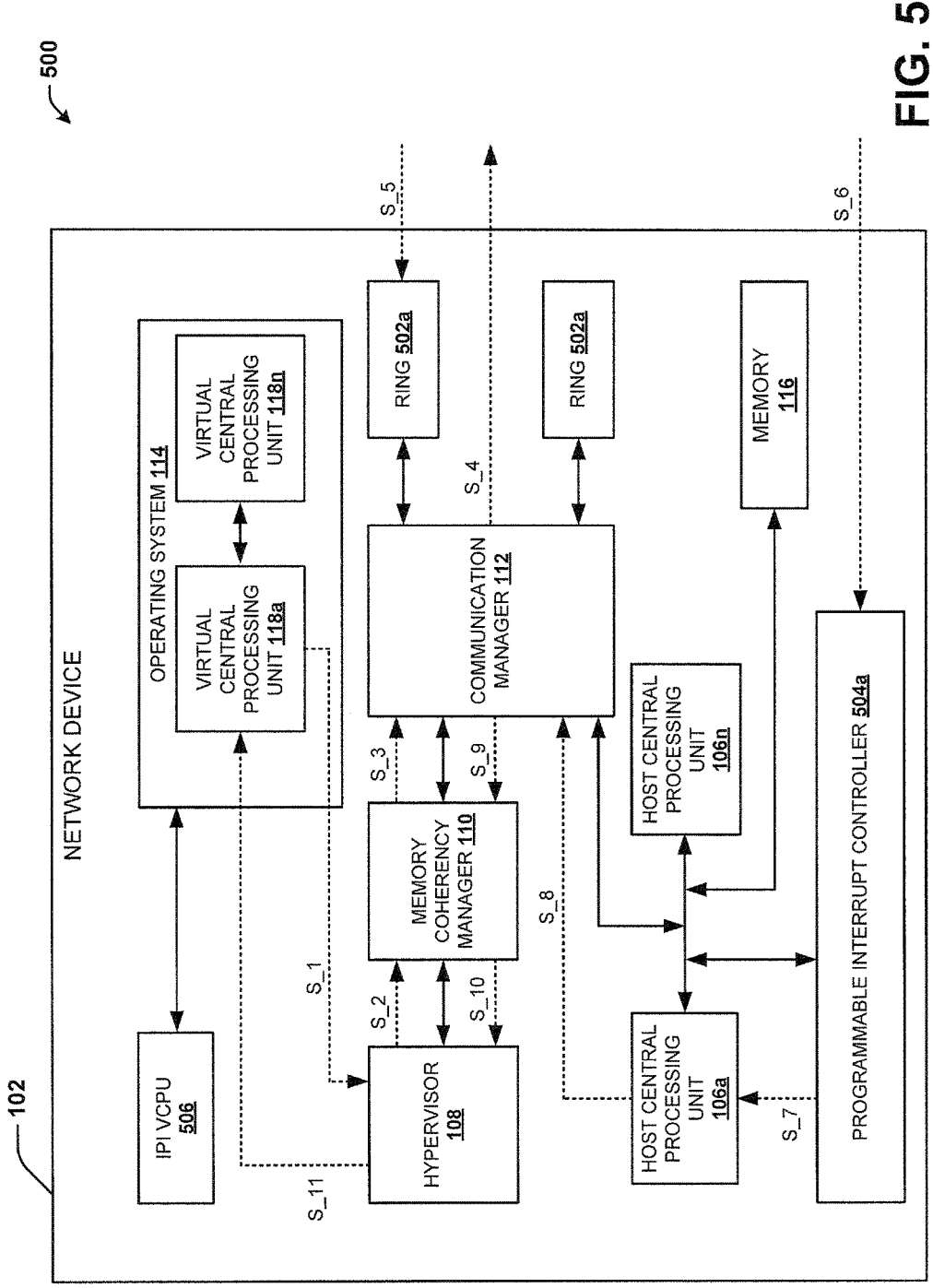
FIG. 5 is a block diagram illustrating an example, non-limiting embodiment of a network device in accordance with various aspects described herein.

Referring now to FIG. 5, a block diagram illustrating an example, non-limiting embodiment of a system 500 in accordance with various aspects described herein is shown. The system 500 can be an embodiment of the network device 102. The network device 102 can include the host central processing units 106a-n, the hypervisor 108, the memory coherency manager 110, the communication manager 112, the operating system 114, the memory 116, rings 502a-n, a programmable interrupt controller 504 and at least one inter processor interrupt (IPI) virtual central processing unit (VCPU) 506. A portion of the operating system 114 realized by the network device 102 can be associated with the virtual central processing units 118a-n.

FIG. 5 can illustrate a set of steps S_1-S_11 for optimizing per page latency and/or minimizing IPIs in a multi-node coherent system associated with the network device 102. For example, at step S_1, the virtual central processing unit 118a can attempt to access a guest physical access page not currently owned by the virtual central processing unit 118a. As such, a fault signal associated with a data abort or an instruction abort can be provided to the hypervisor 108. At step S_2, the hypervisor 108 can check for the guest physical access page that is not currently owned by the virtual central processing unit 118a. The hypervisor 108 can also forward the fault signal to the memory coherency manager 110 for further handling. At step S3, the memory coherency manager 110 can determine a state of the guest physical access page that is not currently owned by the virtual central processing unit 118a. If the guest physical access page is currently owned by another network device (e.g., the network device 104), then the memory coherency manager 110 can allocate a free physical address space (e.g., the physical address space 202 included in the memory 116). Furthermore, if the guest physical access page is currently owned by another network device (e.g., the network device 104), the memory coherency manager 110 can also prepare a page request message (e.g., the page request message 204) and forward the page request message to the communication manager 112. The memory coherency manager 110 can also change a state of the virtual central processing unit 118a to a pause state to pause processing performed by the virtual central processing unit 118a. At step S_4, the communication manager 112 can transmit the page request message to the network device (e.g., the network device 104) that owns a memory associated with the guest physical address page. The communication manager 112 can also transmit an interrupt to the network device (e.g., the network device 104) that owns a memory associated with the guest physical address page.

At step S_5, upon receiving the page request message, the network device (e.g., the network device 104) that owns a memory associated with the guest physical address page can copy memory data (e.g., the memory data 302) to the physical address included in the page request message. The network device (e.g., the network device 104) that owns a memory associated with the guest physical address page can also prepare a page acknowledgment message (e.g., the page acknowledgment message 402) which can be copied to the ring 502a of the network device 102. At step S_6, the network device (e.g., the network device 104) that owns a memory associated with the guest physical address page can generate an interrupt message. The interrupt message can be received by the programmable interrupt controller 504 of the network device 102. For example, data associated with the interrupt message can be stored in a set of registers associated with the programmable interrupt controller 504. At step S_7, the programmable interrupt controller 504 can generate an interrupt to exclusively interrupt the host central processing unit 106a. For example, the programmable interrupt controller 504 can interrupt the host central processing unit 106a without interrupting the host central processing units 106b-n. At step S_8, the communication manager 112 can determine that the interrupt is generated for the host central processing unit 106a. At step S_9, the communication manager 112 can receive a message from the ring 502a that is associated with the page acknowledgment message. The communication manager 112 can also forward the message and/or information associated with the interrupt to the memory coherency manager 110. At step S_10, the memory coherency manager 110 can determine that the page request for the guest physical address is served. The memory coherency manager 110 can then map the guest physical address to the physical address. Furthermore, the memory coherency manager 110 can inform the hypervisor to restore functionality of the virtual central processing unit 118a (e.g., to wake up the virtual central processing unit 118a, to change a state of the virtual central processing unit 118a to a normal processing mode, etc.). At step S_11, the hypervisor 108 can wake up (e.g., immediately wake up) the virtual central processing unit 118a since the hypervisor 108 is local to the virtual central processing unit 118a. As such, the virtual central processing unit 118a can resume processing without generating a data abort or an instruction abort when attempting to access a guest physical address page. It is to be appreciated that the guest physical address page can be determined for the virtual central processing unit 118a without generating an interrupt to other virtual central processing units 118b-n and/or other host central processing units 106b-n. Furthermore, the guest physical address page can be determined for the virtual central processing unit 118a without the IPI VCPU 506 (e.g., without waking up the IPI VCPU 506, without requesting that the IPI VCPU 506 serve an IPI associated with the host central processing unit 106a, without requesting that the IPI VCPU 506 parse IPI parameters, without restoring functionality of the virtual central processing unit 118a via the IPI VCPU 506, etc.). Therefore, system performance associated with the network device 102 can be improved, a number of IPIs associated with the network device 102 can be minimized, and/or average page latency associated with the network device 102 can be reduced.

Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an implementation, the hypervisor 108, the memory coherency manager 110, the communication manager 112, the hypervisor 124, the memory coherency manager 126 and/or the communication manager 128 can constitute machine-executable component(s) and instructions embodied within a memory associated with processor core(s). For example, processor core(s) can facilitate operation of the instructions (e.g., computer executable components and instructions) by the system 100, the system 200, the system 300, the system 400 and/or the system 500.

Figure 6:
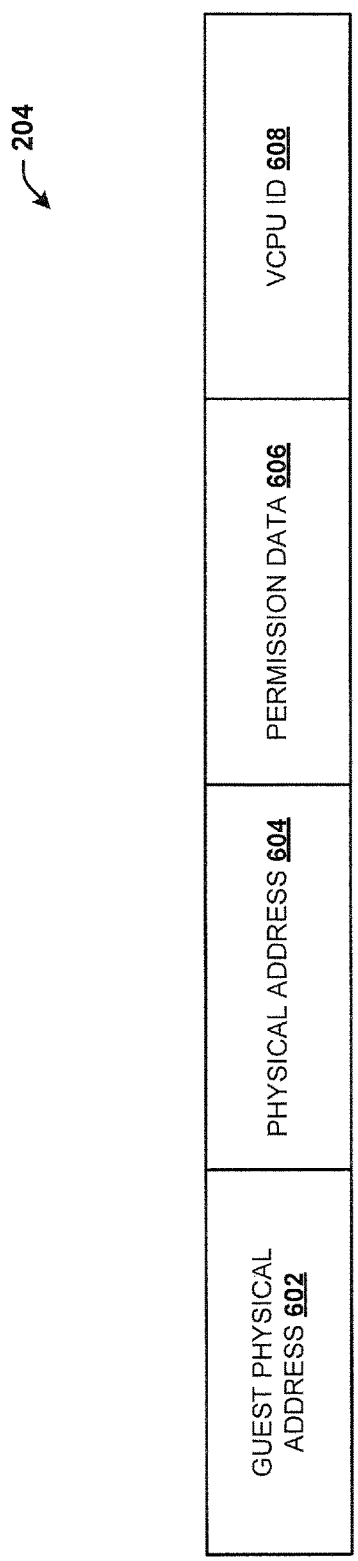
FIG. 6 illustrates an example, non-limiting embodiment of a page request message in accordance with various aspects described herein.

FIG. 6 illustrates an example, non-limiting embodiment of the page request message 204 in accordance with various aspects described herein is shown. The page request message 204 includes a first portion associated with a guest physical address 602, a second portion associated with a physical address 604, a third portion associated with permission data 606, and a fourth portion associated with a virtual central processing unit identifier (VCPU ID) 608. In an aspect, the page request message 204 can be generated by the memory coherency manager 110 and/or transmitted to a network device (e.g., the network device 104) by the communication manager 112.

The guest physical address 602 can be an address within a guest physical address space that corresponds to a physical address space for a virtual central processing unit 118a-n of the network device 102. However, the guest physical address 602 can be a memory address (e.g., a guest physical address) associated with a guest physical address page that is not currently owned by a virtual central processing unit 118a-n of the network device 102. For example, the guest physical address 602 can correspond to an invalid memory access performed by a virtual central processing unit 118a-n of the network device 102. Furthermore, the guest physical address 602 can be associated with a network device (e.g., the network device 104) that is different than the network device 102. The hypervisor 108 can identify the guest physical address 602 in response to an abort fault generated when a virtual central processing unit 118a-n is associated with an invalid memory attempt (when a virtual central processing unit 118a-n of the network device 102 attempts to access a guest physical address page associated with the guest physical address 602). The physical address 604 can be a memory address (e.g., a host physical address) associated with a physical address page that is owned by a virtual central processing unit 118a-n and/or a host central processing unit 106a-n of the network device 102. In an aspect, the physical address 604 can correspond to a physical address space (e.g., the physical address space 202) that is allocated by the memory coherency manager 110 in response to a determination that the guest physical address 602 is not owned by the network device 102. The physical address 604 can, for example, correspond to a physical address space of the network device 102 (e.g., a physical address space of the memory 116).

The permission data 606 can authorize a network device (e.g., the network device 104) to provide memory data (e.g., the memory data 302) to the network device 102. The permission data 606 can additionally or alternatively authorize a network device (e.g., the network device 104) to access memory associated with the physical address 604. The permission data 606 can also include other information to facilitate transmission and/or storage of memory data (e.g., the memory data 302) associated with the guest physical address 602. The VCPU ID 608 can be an identifier for a virtual central processing unit 118a-n of the network device 102. For example, the VCPU ID 608 can be an identifier for a virtual central processing unit 118a-n that attempted to access a guest physical address page associated with the guest physical address 602. In a non-limiting example, the VCPU ID 608 can be an identifier for the virtual central processing unit 118a that unsuccessfully attempted to access a guest physical address page associated with the guest physical address 602. In another non-limiting example, the VCPU ID 608 can be equal to "0" to identify the virtual central processing unit 118a, the VCPU ID 608 can be equal to "1" to identify the virtual central processing unit 118b, the VCPU ID 608 can be equal to "2" to identify the virtual central processing unit 118c, etc.

Figure 7:
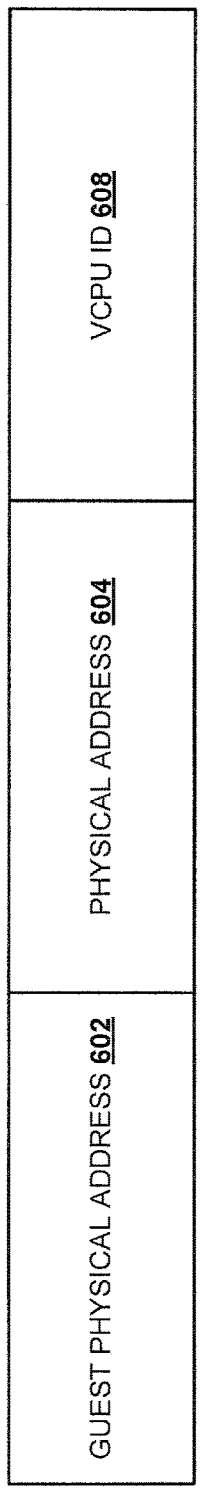
FIG. 7 illustrates an example, non-limiting embodiment of a page acknowledgment message in accordance with various aspects described herein.

FIG. 7 illustrates an example, non-limiting embodiment of the page acknowledgment message 402 in accordance with various aspects described herein is shown. The page acknowledgment message 402 includes a first portion associated with the guest physical address 602, a second portion associated with the physical address 604, and a third portion associated with the VCPU ID 608. The page acknowledgment message 402 can be generated in response to providing memory data (e.g., the memory data 302) to the network device 102. In an aspect, the page acknowledgment message 402 can be generated by a network device that is different than the network device 102 (e.g., the network device that provides the page request message 204). For example, the network device 104 can provide the page acknowledgment message 402 to the network device 102 via the communication channel 120.

The guest physical address 602 included in the page acknowledgment message 402 can correspond to the guest physical address 602 included in the page request message 204. The physical address 604 included in the page acknowledgment message 402 can correspond to the physical address 604 included in the page request message 204. Furthermore, the VCPU ID 608 included in the page acknowledgment message 402 can correspond to the VCPU ID 608 included in the page request message 204. The network device 102 can employ the VCPU ID 608 to facilitate resuming functionality of the virtual processing unit 118a-n associated with the VCPU ID 608 (e.g., in response to mapping of the guest physical address 602 to the physical address 604).

Figure 8:
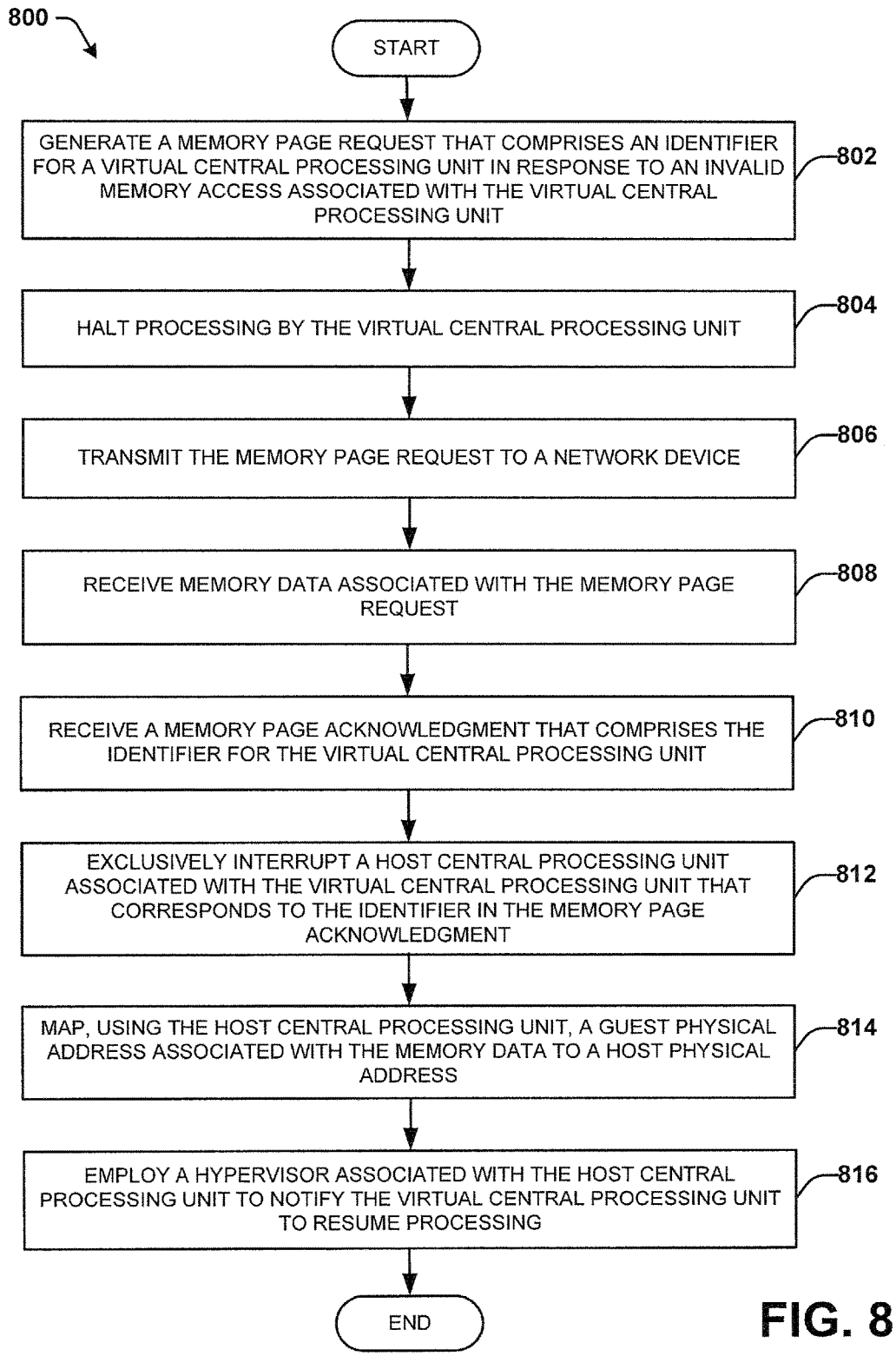
FIG. 8 illustrates a flow diagram of an example, non-limiting embodiment of a method for optimizing memory page latency and minimizing inter processor interrupts in a multi-node system.
Figure 9:
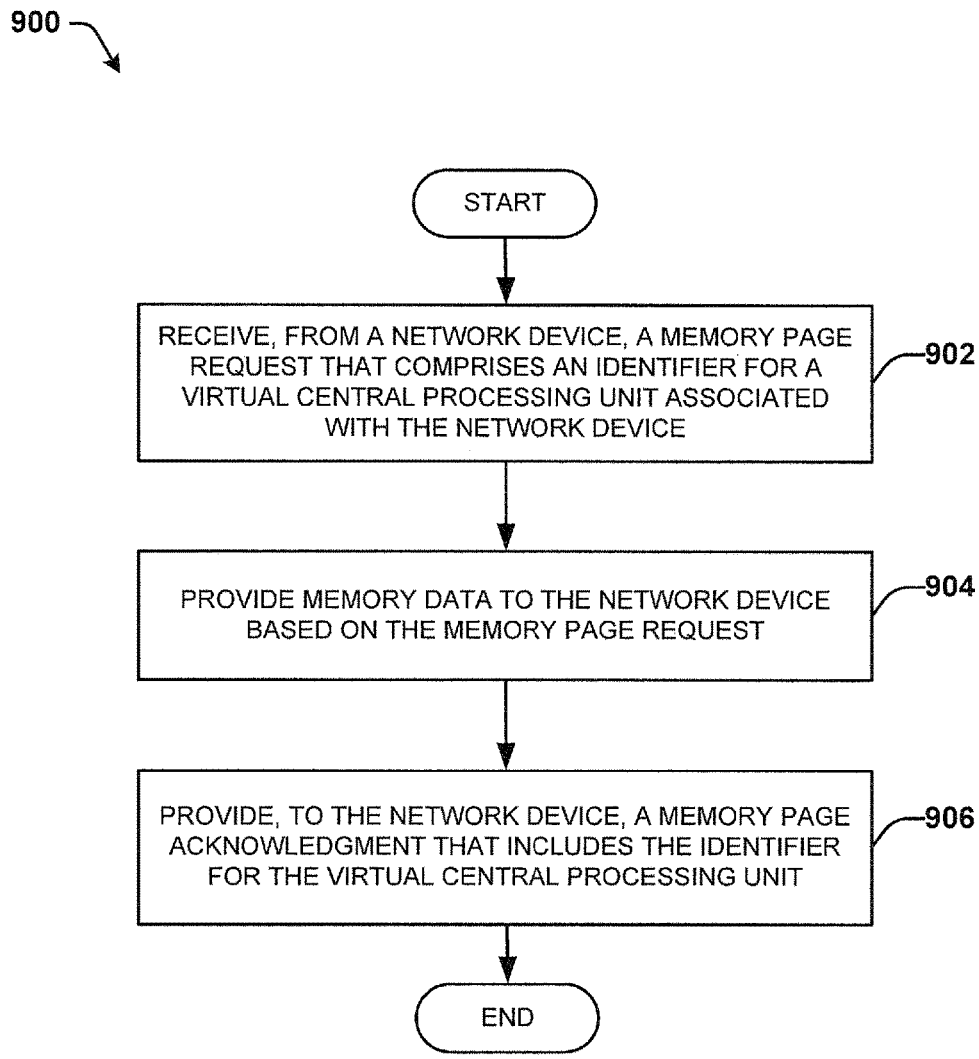
FIG. 9 illustrates a flow diagram of another example, non-limiting embodiment of a method for optimizing memory page latency and minimizing inter processor interrupts.

In view of the example systems described above, methods that may be implemented in accordance with the described subject matter may be better appreciated with reference to the flow charts of FIGS. 8-9. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 8, a flow diagram of an example, non-limiting embodiment of a method 800 for optimizing memory page latency and minimizing IPIs in a multi-node system is shown. Method 800 can be associated with a network system (e.g., the system 100, the system 200, the system 300, the system 400 or the system 500). Furthermore, method 800 can be associated with a network device (e.g., the network device 102). Method 800 can begin at block 802, where a memory page request that comprises an identifier for a virtual central processing unit is generated in response to an invalid memory access associated with the virtual central processing unit. For example, the memory page request can be a page request message that includes the identifier, a guest physical address, a physical address and/or permission data for accessing a network device associated with the virtual central processing unit. The virtual central processing unit can be associated with a set of virtual central processing units implemented on a network device. The invalid memory access request can be determined in response to the virtual central processing unit accessing a memory page (e.g. a guest physical address page) that is not currently owned by the virtual central processing unit. At block 804, processing by the virtual central processing unit is halted. For example, a processing state of the virtual central processing unit is altered to a paused state. At block 806, the memory page request transmitted to a network device. For example, the memory page request can be transmitted via communication channel that couples the network device and another network device associated with the virtual central processing unit.

At block 808, memory data associated with the memory page request is received. The memory data can be retrieved from a memory location included in the memory page request. For example, the memory data can be retrieved from a memory location associated with the guest physical address included in the memory page request. At block 810, a memory page acknowledgment that comprises the identifier for the virtual central processing unit is received. For example, the memory page acknowledgment can include the same identifier as the identifier included in the memory page request. The memory page acknowledgment can be employed to initiate and/or facilitate an interrupt process for host central processing units implemented by the network device associated with the virtual central processing unit. At block 812, a host central processing unit associated with the virtual central processing unit that corresponds to the identifier in the memory page acknowledgment is exclusively interrupted. For example, the memory page acknowledgment can allow affinity of processor interrupts to be directed to a single processing unit instead of broadcasting interrupts to all processing units implemented on a network device. At block 814, a guest physical address associated with the memory data is mapped, using the host central processing unit, to a host physical address. For example, the guest physical address can be mapped to a host physical address allocated for a memory implemented on a network device associated with the virtual central processing unit. At block 816, a hypervisor associated with the host central processing unit is employed to notify the virtual central processing unit to resume processing. For example, the hypervisor associated with the host central processing unit can restore functionality of the virtual central processing unit (e.g., the hypervisor associated with the host central processing unit can wake up the virtual central processing unit).

Referring to FIG. 9, a flow diagram of another example, non-limiting embodiment of a method 900 for optimizing memory page latency and minimizing IPIs in a multi-node system is shown. Method 900 can be associated with a network system (e.g., the system 100, the system 200, the system 300, the system 400 or the system 500). Furthermore, method 900 can be associated with a network device (e.g., the network device 104). Method 900 can begin at block 902, where a memory page request that comprises an identifier for a virtual central processing unit associated with a network device is received from the network device. For example, the network device can transmit the memory page request via a physical communication channel in response to a determination that the virtual central processing unit is associated with an invalid memory access. At block 904, memory data is provided to the network device based on the memory page request. For example, the memory page request can identify a memory location (e.g., a guest physical address) associated with the memory data. At block 906, a memory page acknowledgment that includes the identifier for the virtual central processing unit is provided to the network device. For example, the memory page acknowledgment can be transmitted to the network device via a physical communication channel.

Example Computing Environment

Figure 10:
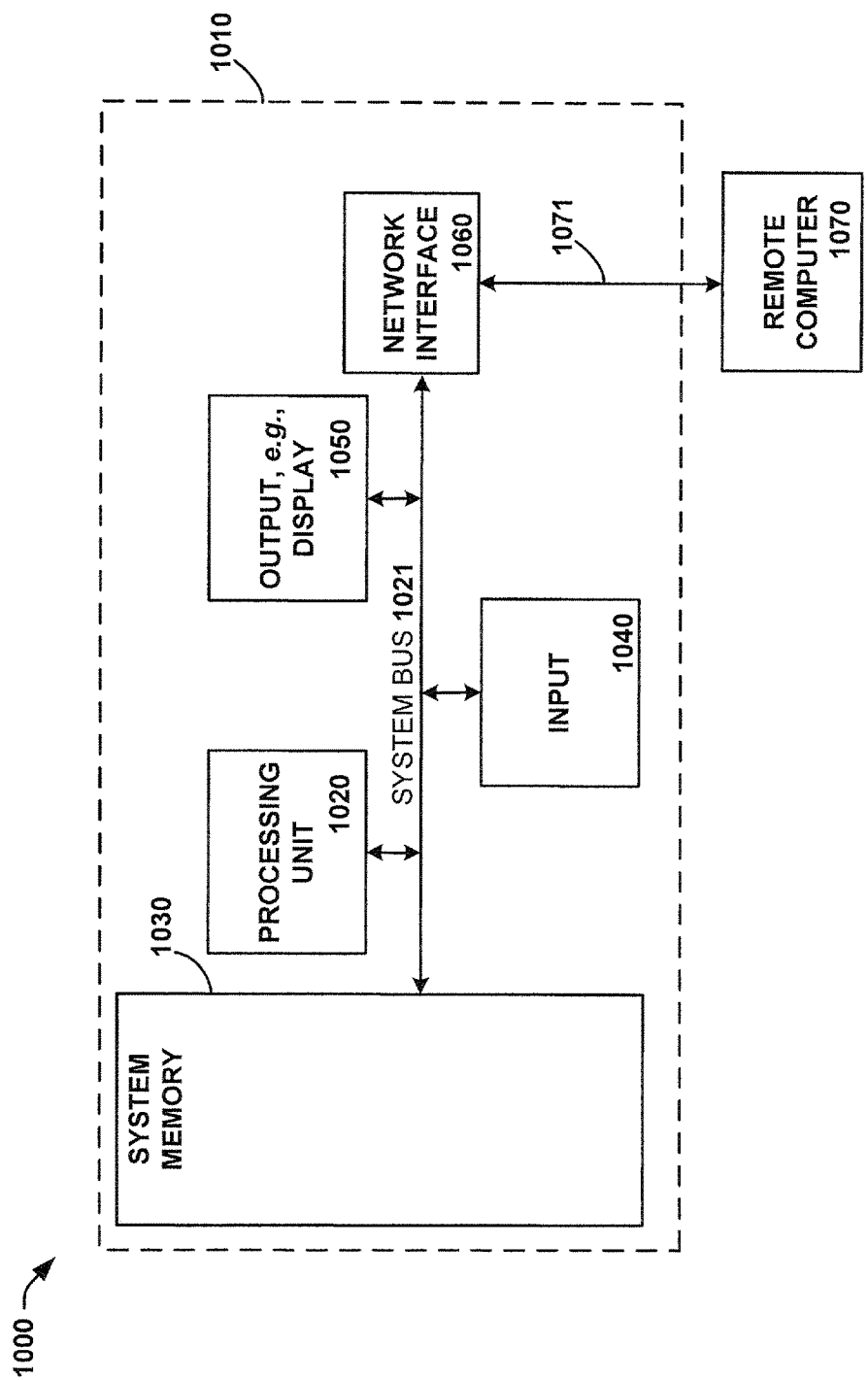
FIG. 10 illustrates a block diagram of an example electronic computing environment that can be implemented in conjunction with one or more aspects described herein.

As mentioned, advantageously, the techniques described herein can be applied to any device where it is desirable to optimize memory page latency and/or minimize inter processor interrupts associated with network nodes in a virtual computer system. It is to be understood, therefore, that handheld, portable and other computing devices and computing objects of all kinds are contemplated for use in connection with the various non-limiting embodiments, i.e., anywhere that a device may wish to optimize memory page latency and/or minimize inter processor interrupts associated with network nodes in a virtual computer system. Accordingly, the below general purpose remote computer described below in FIG. 10 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 10 thus illustrates an example of a suitable computing system environment 1000 in which some aspects of the disclosed subject matter can be implemented, although as made clear above, the computing system environment 1000 is only one example of a suitable computing environment for a device and is not intended to suggest any limitation as to the scope of use or functionality of the disclosed subject matter. Neither should the computing environment 1000 be interpreted as having any dependency or requirement relating to any one or combination of components illustrated in the exemplary operating environment 1000.

With reference to FIG. 10, an exemplary device for implementing the disclosed subject matter includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules, or other data in a modulated data signal such as a carrier wave or other transport mechanism and includes any information delivery media.

The system memory 1030 may include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, may be stored in memory 1030. Memory 1030 typically also contains data and/or program modules that are immediately accessible to and/or presently being operated on by processing unit 1020. By way of example, and not limitation, memory 1030 may also include an operating system, application programs, other program modules, and program data.

The computer 1010 may also include other removable/non-removable, volatile/nonvolatile computer storage media. For example, computer 1010 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1021 through a non-removable memory interface such as an interface, and a magnetic disk drive or optical disk drive is typically connected to the system bus 1021 by a removable memory interface, such as an interface.

A user can enter commands and information into the computer 1010 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1020 through user input 1040 and associated interface(s) that are coupled to the system bus 1021, but may be connected by other interface and bus structures, such as a parallel port, game port, or a universal serial bus (USB). A graphics subsystem can also be connected to the system bus 1021. A projection unit in a projection display device, or a HUD in a viewing device or other type of display device can also be connected to the system bus 1021 via an interface, such as output interface 1050, which may in turn communicate with video memory. In addition to a monitor, computers can also include other peripheral output devices such as speakers which can be connected through output interface 1050.

The computer 1010 can operate in a networked or distributed environment using logical connections to one or more other remote computer(s), such as remote computer 1070, which can in turn have media capabilities different from computer 1010. The remote computer 1070 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1010. The logical connections depicted in FIG. 10 include a network 1071, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1010 can be connected to the LAN 1071 through a network interface or adapter. When used in a WAN networking environment, the computer 1010 can typically include a communications component, such as a modem, or other means for establishing communications over the WAN, such as the Internet. A communications component, such as wireless communications component, a modern and so on, which can be internal or external, can be connected to the system bus 1021 via the user input interface of input 1040, or other appropriate mechanism. In a networked environment, program modules depicted relative to the computer 1010, or portions thereof, can be stored in a remote memory storage device. It will be appreciated that the network connections shown and described are exemplary and other means of establishing a communications link between the computers can be used.

Example Networking Environment

Figure 11:
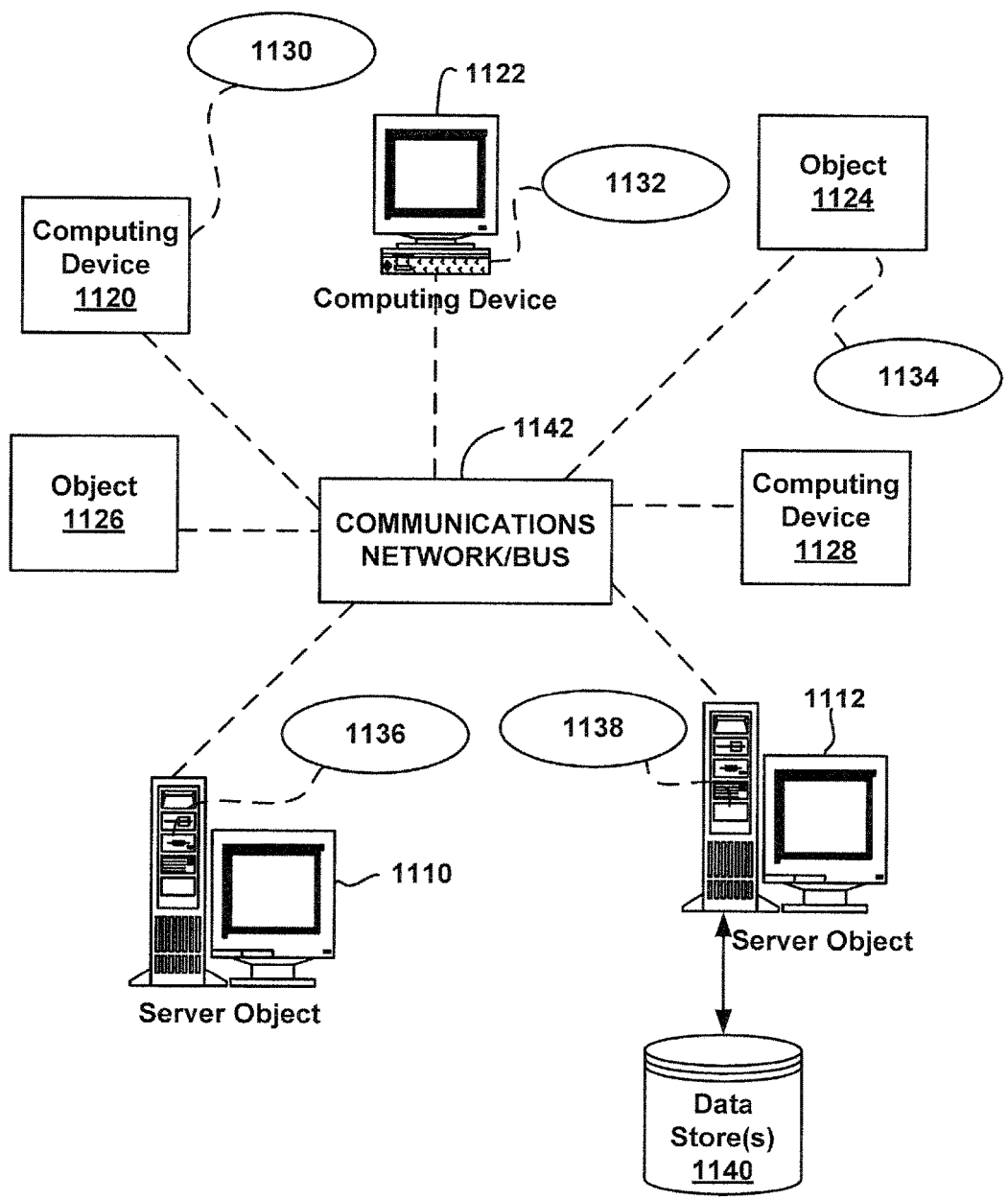
FIG. 11 illustrates a block diagram of an example data communication network that can be operable in conjunction with various aspects described herein.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1140 can include memory or other similar data stores as disclosed herein.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, ... ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick, key drive ... ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for optimizing memory page latency associated with network nodes, comprising:
   a first network node configured for generating a memory page request in response to an invalid memory access associated with a first virtual central processing unit of a plurality of virtual central processing units of the first network node, the memory page request comprising an identifier for the first virtual central processing unit; and
   a second network node configured for receiving the memory page request and providing memory data associated with memory page request to the first network node,
   wherein the first network node is configured for allocating a physical address space associated with the first network node in response to the invalid memory access;
   wherein the first network node is configure for mapping a guest physical address associated with the invalid memory access to a physical address associated with the physical address space, and
   wherein the second network node is configured for transmitting a memory page acknowledgment to the first network node, and the memory page acknowledgement transmitted from the second network node to the first network node comprises the identifier for the first virtual central processing unit.

2. The system of claim 1, wherein the memory page request further comprises the guest physical address associated with the invalid memory access.

3. The system of claim 1, wherein the memory page request further comprises the physical address associated with the physical address space.

4. The system of claim 1, wherein the first network node is configured for generating an interrupt signal for exclusively interrupting a first host central processing unit associated with the first virtual central processing unit identified in the memory page acknowledgment, wherein the first host central processing unit is one of a plurality of host central processing units of the first network node, each host central processing units associated with one or more of the plurality of virtual central processing units of the first network node.

5. The system of claim 4, wherein the first network node is configured for generating the interrupt signal for the first host central processing unit without broadcasting the interrupt signal to other host central processing units of the plurality of host central processing units of the first network node.

6. The system of claim 1, wherein the memory data is provided to an operating system of the first network node by a first host central processing unit associated with the first virtual central processing unit identified in the memory page acknowledgment.

7. The system of claim 1, wherein the first network node is a first system on a chip (SoC) and the second network node is a second SoC different from the first SoC.

8. A method for optimizing memory page latency associated with network nodes, comprising:
   generating a memory page request that comprises an identifier for a first virtual central processing unit of a plurality of virtual central processing units of a first network node in response to an invalid memory access associated with the first virtual central processing unit;
   transmitting the memory page request from the first network node to a second network node;
   receiving, at the first network node from the second network node, a memory page acknowledgment that comprises the identifier for the first virtual central processing unit; and
   exclusively interrupting a first host central processing unit associated with the first virtual central processing unit that corresponds to the identifier in the memory page acknowledgment, wherein the first host central processing unit is one of a plurality of host central processing units of the first network node, each host central processing units associated with one or more of the plurality of virtual central processing units of the first network node.

9. The method of claim 8, further comprising mapping, by the first network node, a guest physical address to a host physical address.

10. The method of claim 8, further comprising halt processing, by the first virtual central processing unit, in response to the invalid memory access.

11. The method of claim 10, further comprising employing a hypervisor associated with the first host central processing unit to notify the first virtual central processing unit to resume processing in response to the memory page acknowledgment.

12. The method of claim 8, further comprising receiving memory data associated with the memory page request.

13. The method of claim 8, further comprising receiving memory data from a memory location that corresponds to a guest physical address associated with the invalid memory access.

14. A network device, comprising:
   a first virtual central processing unit of a plurality of virtual central processing units, the first virtual central processing unit configured for generating an abort signal in response to an invalid memory access associated with a guest physical address;
   a memory coherency manager configured for generating a page request message in response to the invalid memory access, the page request message comprising an identifier for the first virtual central processing unit, and the page request message being configured for being transmitted, by the network device, to another network device coupled to the network device via a physical communication channel; and
   a first host central processing unit associated the first virtual central processing unit and configured for to be exclusively interrupted in response to receipt, by the network device, of a memory page acknowledgement, from the another network device, wherein the memory page acknowledgement comprises the identifier for the first virtual central processing unit.

15. The network device of claim 14, wherein the memory coherency manager is configured for allocating a physical address space for the physical address in a memory of the network device and mapping of the guest physical address to a physical address associated with the network device.

16. The network device of claim 15, wherein the first host central processing unit is farther configured for restoring functionality of the first virtual central processing unit in response to the mapping.

17. The network device of claim 14, wherein the network device is a first system on a chip (SoC).

18. The network device of claim 17, wherein the another network device is a second SoC different from the first SoC.

19. The network device of claim 18, wherein the first SoC and the second SoC are associated with the same physical device.

* * * * *

UNITED STATES PATENT AND TRADEMARK OFFICE
CERTIFICATE OF CORRECTION

PATENT NO. : 10,439,960 B1  
APPLICATION NO. : 15/351477  
DATED : October 8, 2019  
INVENTOR(S) : Jindal et al.

Page 1 of 1

It is certified that error appears in the above-identified patent and that said Letters Patent is hereby corrected as shown below:

In the Claims

Column 21,
Line 62, Claim 1 "configure for mapping" should read --configured for mapping--.

Column 22,
Line 1, Claim 1 "memory page acknowledgement" should read --memory page acknowledgment--.

Column 23,
Line 21, Claim 14 "associated the first" should read --associated with the first--;
Line 22, Claim 14 "configured for to be" should read --configured to be--.

Column 24,
Line 12, Claim 16 "unit is farther configured" should read --unit is further configured--.

Signed and Sealed this
Eighteenth Day of February, 2020

Andrei Iancu
*Director of the United States Patent and Trademark Office*